P. DE MONTS.
VEHICLE COUPLING DEVICE.
APPLICATION FILED MAR. 17, 1916.

1,218,631.

Patented Mar. 13, 1917.

Inventor
Pierre de Monts

Attorney

UNITED STATES PATENT OFFICE.

PIERRE DE MONTS, OF MARSEILLE, FRANCE.

VEHICLE-COUPLING DEVICE.

1,218,631. Specification of Letters Patent. Patented Mar. 13, 1917.

Application filed March 17, 1916. Serial No. 84,799.

*To all whom it may concern:*

Be it known that I, PIERRE DE MONTS, a citizen of France, residing at Rue Montgrand, No. 30, Marseille, France, have invented new and useful Improvements in Vehicle-Coupling Devices, of which the following is a specification.

This invention relates to an improved two-wheeled trailer adapted to be attached to the rear of any suitable vehicle such as a motor car by means of a special coupling capable of being rapidly fitted in position.

The special coupling arrangement enables the trailer to be instantaneously attached and released and the wheels of the said trailer to travel mathematically in the exact tracks of the driving wheels of the motor car or the like, whatever curve the latter may describe. This method of attachment permits both the connected vehicles, the motor and the trailer, flectional movements in all directions which the inequalities, however great they may be, of the track, may impart to them.

The present invention is more particularly described in the accompanying drawings in which—

Fig. 3 is a horizontal section partly in elevation; Fig. 3ª is a vertical section through the coupling bar showing one of the hemispheres in elevation.

Figs. 4 and 4ª are views of the trailer and its peculiar arrangements.

Figure 1:
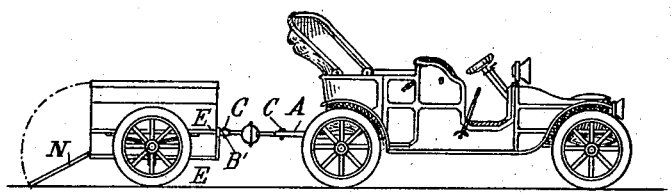
Figure 1 is a view as a whole of the two vehicles coupled.
Figure 2:
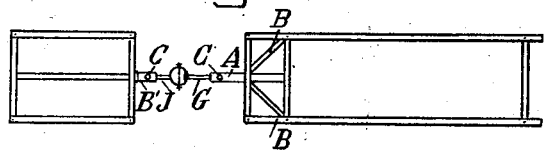
Fig. 2 is a plan view of the coupling to be fixed to the motor car, or vehicle.
Figure 2:
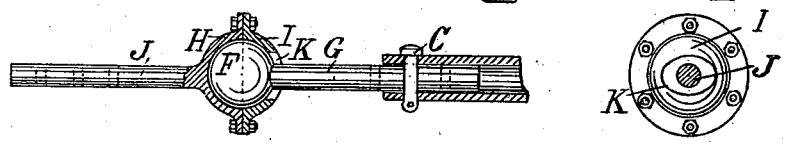
Figure 2:
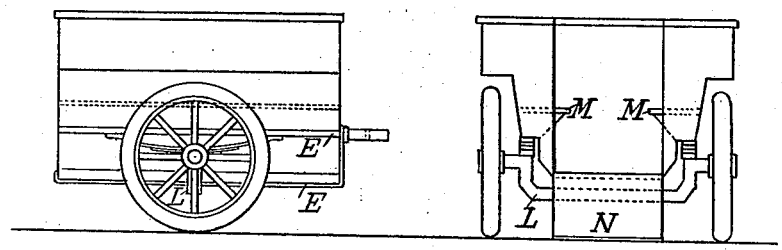
Figure 2:
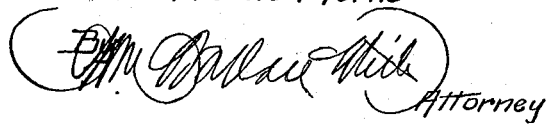

The special coupling (Fig. 2) which is placed at the rear of the motor car, or vehicle, is formed of a horizontal socket A bolted to the center of the last and last but one cross bar or cross piece of the chassis and connected by reinforced draw-bars B of metal. The socket A has a transverse hole for the passage of a cotter C intended to fix the end of the coupling arrangement G.

On the trailer a socket B′ similar to the socket A is fixed in the center of the front cross bar of the chassis and held firm by draw-bars E.

The coupling arrangement (Fig. 3) consists of an enarthrodial or universal joint formed of a sphere F connected to a coupling bar G turning freely in all directions up to the most acute angle which the two vehicles can describe in two hollow hemispherical cups H, I, connected by bolts, with a washer interposed for taking up wear. One of these two hemispheres H is cast to one of the coupling bars J, the other I is bored with an oval aperture K allowing the last bar of the coupling G to enter and to have play therein.

The coupling bars G and J are each bored with three holes which, when they are inserted in the sockets A and B, correspond with the holes in these latter to allow of the insertion of the keys or cotters C.

The length of the coupling bars is so arranged that the universal joint is always placed half way between the axis of the rear wheels of the motor and the axis of the wheels of the trailer and consequently forces the wheels of the latter to run in the same track as the driving wheels of the motor car.

The trailer (Fig. 4) is formed of a chassis mounted on a bent axle L, resting on two free wheels.

The carriage body of this trailer may be of any suitable pattern, but a tub form will allow, by means of folding seats M, passengers to be received, and, by lowering these seats, animals or goods to be carried. By lowering to the ground the rear wall N of this form of car an inclined plane which is not too steep may be provided from the ground to the bottom of the tub in order to facilitate the loading of the trailer.

The advantage of this trailer is that it enables passengers, animals or goods to be conveyed with but little reduction in the speed of the motor car, and in the case of conveying goods it enables the loaded trailer to be left and the motor car to start away immediately with an empty trailer in order to take further goods without loss of time.

Having now particularly described and ascertained the nature of my said invention and in what manner the same is to be performed, I declare that what I claim is:—

1. A coupling device comprising a bar, a hollow hemisphere carried by the bar, a second hollow hemisphere secured to the first hemisphere and provided with an opening, a ball disposed between the hemispheres and a bar connected to the ball and projecting through the opening, sleeves disposed on the bars and provided with openings arranged to register with openings formed in the bars, and pins arranged to pass through the openings when in register.

2. In combination with two adjacent vehicles, sleeves secured to the vehicles, bars adjustably secured to the sleeves, a hollow hemisphere secured on the end of one bar, a second hemisphere secured to the first hemisphere and provided with an opening through which the other bar may project and a retaining member disposed between the hemispheres and connected to the second bar.

In testimony whereof I have signed my name to this specification in the presence of two subscribing witnesses.

PIERRE DE MONTS.

Witnesses:
 EUGENE ZEATTON,
 ALLAN MACFARLANE.

Copies of this patent may be obtained for five cents each, by addressing the "Commissioner of Patents, Washington, D. C."